Dec. 23, 1924.
F. R. CORNWALL
1,520,176
SIX-WHEEL TRUCK
Filed Dec. 29, 1922    3 Sheets-Sheet 1
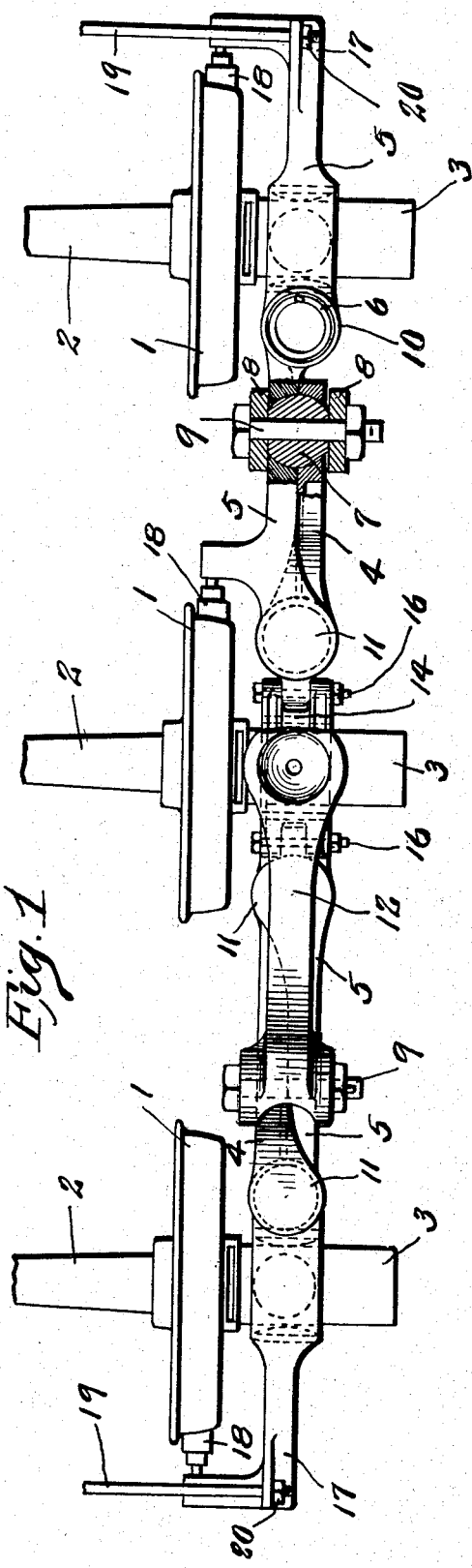
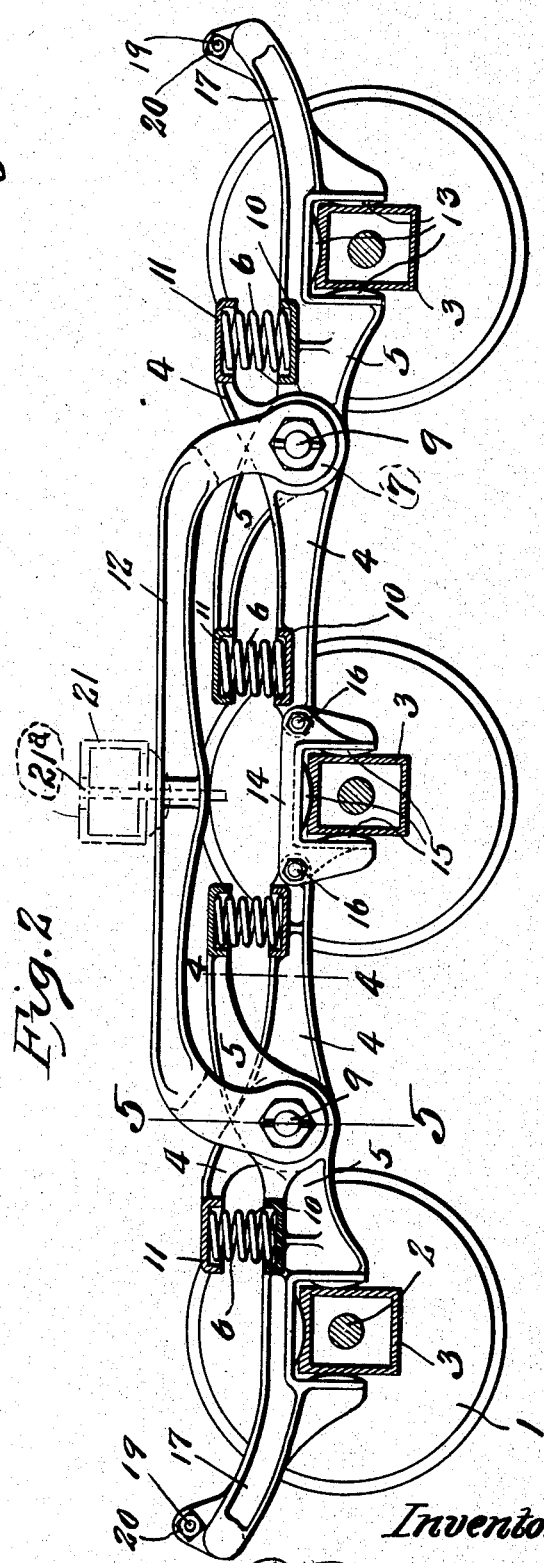
Inventor
F. R. Cornwall Dec. 23, 1924.
F. R. CORNWALL
SIX-WHEEL TRUCK
Filed Dec. 29, 1922
1,520,176
3 Sheets-Sheet 2
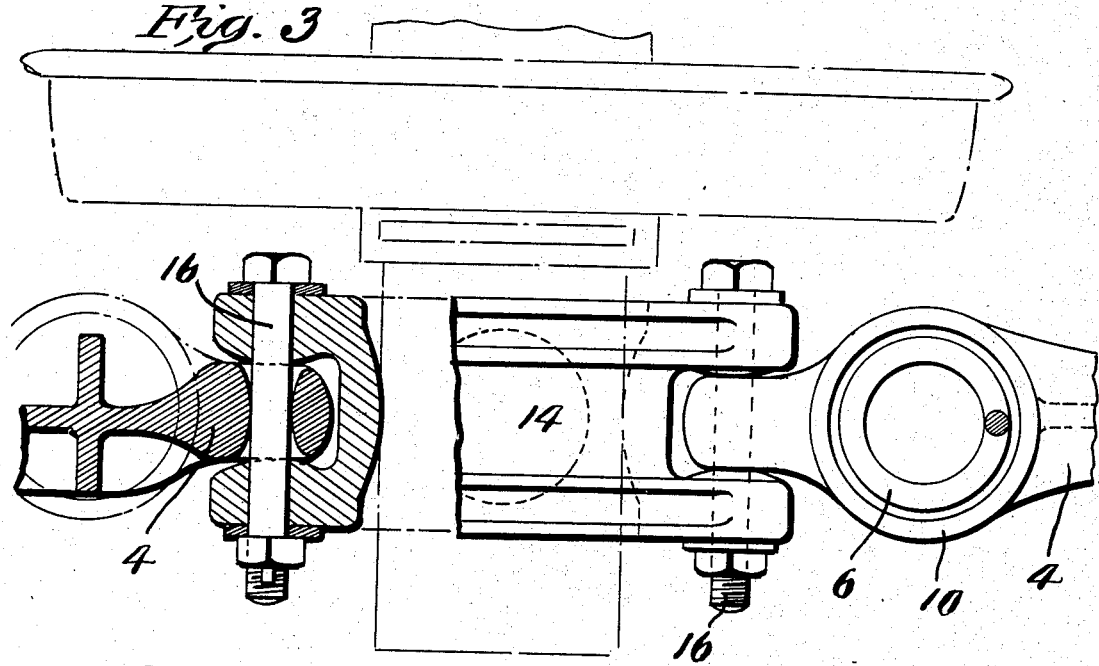
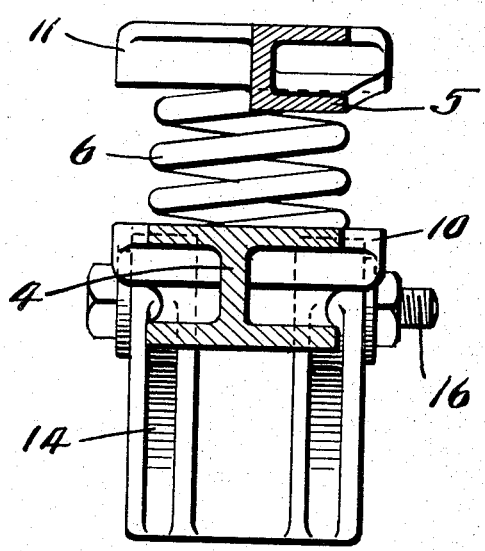
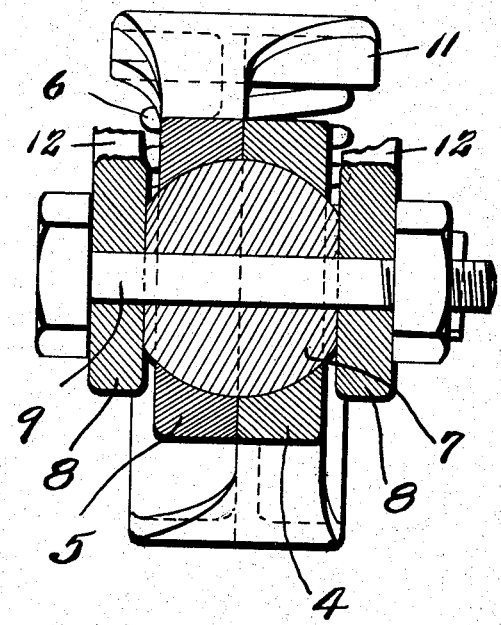
Inventor
F. R. Cornwall Dec. 23, 1924.  1,520,176
F. R. CORNWALL
SIX-WHEEL TRUCK
Filed Dec. 29, 1922  3 Sheets-Sheet 3.
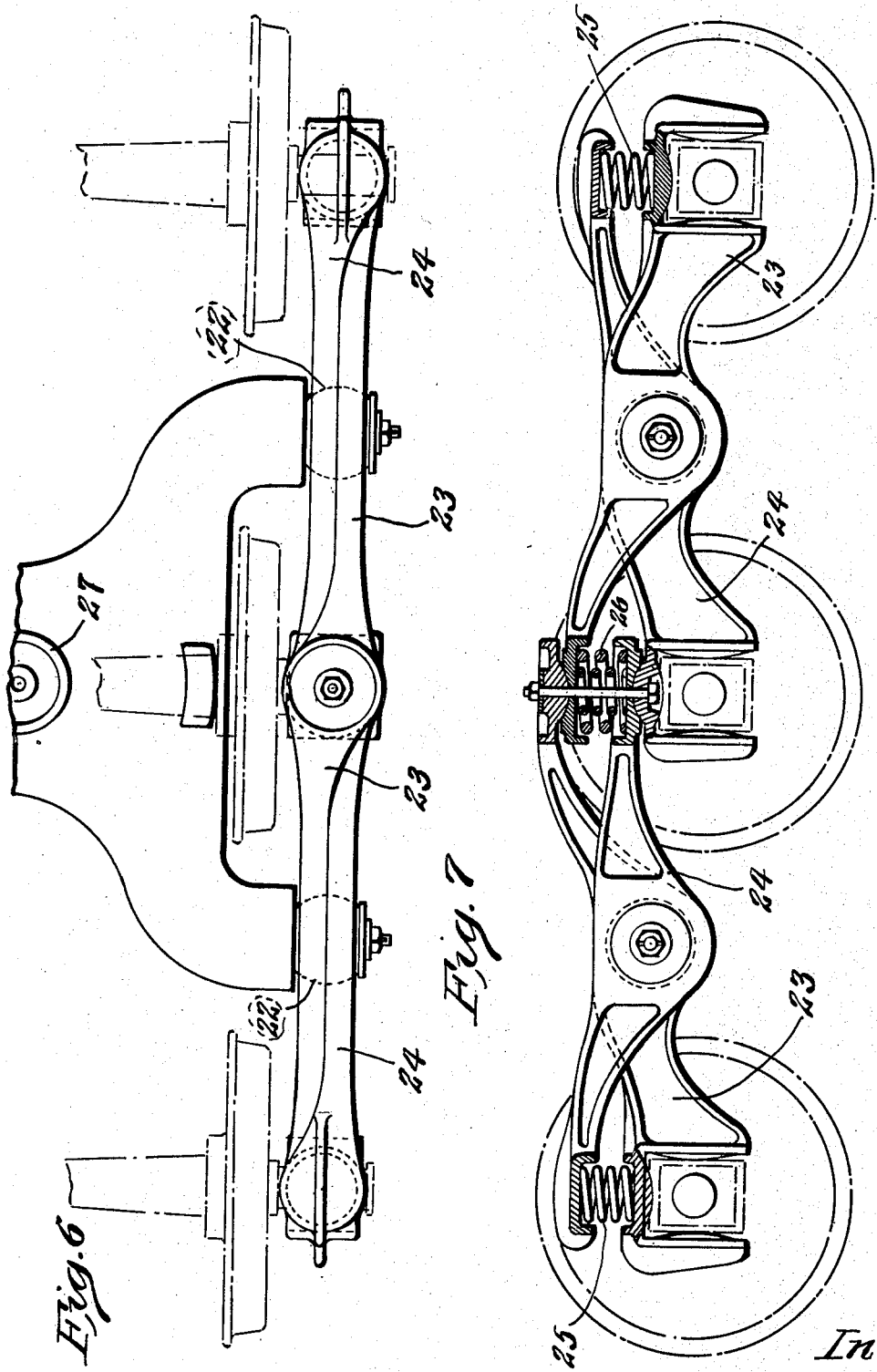

Patented Dec. 23, 1924.

1,520,176

UNITED STATES PATENT OFFICE.

FREDERICK R. CORNWALL, OF ST. LOUIS, MISSOURI; MAY BUSHALL CORNWALL, EXECUTRIX OF SAID FREDERICK R. CORNWALL, DECEASED, ASSIGNOR, BY MESNE ASSIGNMENTS, TO MAY B. CORNWALL, OF ST. LOUIS, MISSOURI.

SIX-WHEEL TRUCK.

Application filed December 29, 1922. Serial No. 609,623.

*To all whom it may concern:*

Be it known that I, FREDERICK R. CORNWALL, a citizen of the United States, residing at St. Louis, Missouri, have invented a certain new and useful Improvement in Six-Wheel Trucks, of which the following is a full, clear, and exact description, such as will enable others skilled in the art to which it appertains to make and use the same, reference being had to the accompanying drawings, forming part of this application.

My invention relates to six wheel trucks for railroad rolling stock and consists in an articulated equalizing truck frame similar to the four wheel truck frame described in my copending application Serial Number 603,591, filed November 27, 1922.

The objects of my invention are to provide in a heavy duty six wheel truck a high degree of flexibility both in vertical and horizontal planes and to obtain these results by means of simple economical construction which preferably includes the use of cast steel elements which provide for a minimum amount of assembly work, dead weight, and undesirable joints.

In the accompanying drawings which illustrate my invention—

Figure 1 is a top view of one side of a truck, a detail of the truck being sectioned horizontally for clearer illustration.

Figure 2 is a side elevation of the truck.

Figure 3 is a top view and horizontal section on an enlarged scale of the wheel piece and journal box assembly at the middle wheel.

Figure 4 is a vertical transverse section taken on the line 4—4 of Figure 2.

Figure 5 is a similar section taken on the line 5—5 of Figure 2.

Figures 6 and 7 are, respectively, a top view and a side elevation, sectioned in part, of a modified form of my invention.

The truck structure includes the usual wheels 1 and axles 2 and journal boxes 3 slightly modified from the standard journal boxes. Each truck side frame mounted upon the journal boxes includes two pairs of crossed arms or wheel pieces, one arm or wheel piece 4 of each pair being supported at one end upon the middle journal box while the end journal boxes support one end of the other wheel piece 5 of each pair. It will be noted that the wheel pieces extend toward each other and cross intermediate their ends and the ends of each wheel piece not mounted on the journal boxes 3 extend over the journal box mounted end of the other wheel piece and is supported therefrom by means of a compressed coil spring 6. I refer to the journal box mounted ends of the wheel pieces as their fixed ends and to the opposite ends as their free ends, although the journal box end is not rigidly secured to the journal box nor is the opposite end unrestricted in its movement.

Wheel pieces 4 and 5 are pivoted to each other at their crossing points by means of a ball and socket joint comprising a ball member 7 seated in opposed sockets formed in the wheel pieces. The load carried by the truck is transmitted to the two pairs of wheel pieces on each side of the truck by a yoke 12 which is connected to the wheel pieces through ball 7. The yoke straddles each pair of wheel pieces at their crossing point and is pivotally connected to the ball by means of a bolt 9. The forked ends 8 of the yoke form positive retaining elements for the wheel pieces to prevent their lateral separation but it will be understood that the wheel pieces are yieldingly maintained in the relative transverse position shown in Figure 1 by the expansion force of springs 6 which are seated in suitable recesses 10 and 11 formed on the upper and lower faces, respectively, of the wheel pieces and are vertically aligned when the wheel pieces contact with each other at their meeting face as shown.

The fixed end of each of the wheel pieces 5 straddles its respective journal box and is provided on all journal box engaging faces with convex projections 13 which engage the walls of the journal box, thus providing spherical engagement of the faces which permits a limited amount of pivotal movement between them. The fixed ends of wheel pieces 4 are mounted upon the middle journal box by means of a common saddle 14 having spherical bosses 15 corresponding to bosses 13 and similarly engaged with the middle journal box. The connection between wheel pieces 4 and saddle 14 is a pivotal one provided by bolts 16 which permits one wheel piece 4 to move about the saddle as a pivot without necessarily affecting the other wheel piece 4. This pivotal movement may be in a horizontal plane as well as in a vertical plane due to the rounding of the wall of the bolt engaging hole in the wheel pieces as best shown in Figure 3. The engagement of the saddle with the journal box is such that there may be relative pivotal movement between them.

Extensions 17 are formed on the outer ends of wheel pieces 5 to provide integral supports for the brake rigging indicated at 18 and a rigid point of attachment for truck frame end members 19 which may consist of rods threaded at their ends and secured to extensions 17 by nuts 20.

In the construction illustrated in Figures 1 to 5, the body bolster 21 forms part of the car underframe, and has a ball and socket connection at each end with the oppositely arranged yokes 12. A king pin 21ª may be used if desired.

In the modified form shown in Figures 6 and 7, which is a type of swiveling truck, the yokes are formed integrally with a truck bolster member, and the ends of the yoke members are provided with spaced ball elements 22 which are seated in corresponding recesses in the crossed wheel pieces comprising the truck side frame.

These wheel pieces 23 and 24 resemble wheel pieces 4 and 5 but it will be noted that the spring supports 25 and 26 are provided immediately over the end and middle journal boxes, respectively, and the inner fixed ends of wheel pieces 24 accordingly overlap each other as do the inner free ends of wheel pieces 23.

The construction shown in Figures 6 and 7 is a very simple one and may be satisfactorily used for standard six wheel truck requirements. Like the form shown in Figures 1 to 5, it contains many points of flexibility and the passage of the wheels over any elevation or depression in the track will not materially vary the angle of the bolster center plate 27. The truck side frames act as spring supported equalizing members and their pivotal axes cause the wheels to move vertically in defined arcuate paths.

In both forms of my invention the load may be transmitted to the wheels as desired, the spacing of the pivotal crossing points between the journal boxes serving to proportion the distribution of the load, and it will be noted that the wheel pieces serve as spring supported equalizers thus eliminating the additional members and connections usually provided for that purpose. Furthermore, there is ample space to remove and replace brake-heads and shoes without unhanging the brake beams.

I claim:

1. In a six wheel truck, axle journal boxes, two pairs of crossed wheel pieces on each side of the truck, each wheel piece being supported at one end upon a journal box and at its opposite end upon another wheel piece.

2. In a six wheel truck, axle journal boxes, two pairs of crossed wheel pieces on each side of the truck, each wheel piece being supported at one end upon a journal box and at its opposite end upon another wheel piece, and bolster carrying means supported from the crossing points of said wheel pieces.

3. In a six wheel truck, axle journal boxes, two pairs of crossed wheel pieces on each side of the truck, one wheel piece of each pair being supported at one end upon a journal box and at its opposite end upon the other wheel piece of that pair.

4. In a six wheel truck, axle journal boxes, two pairs of crossed wheel pieces on each side of the truck, one wheel piece of each pair being supported at one end upon a journal box and at its opposite end upon the other wheel piece of that pair, and a bolster supporting yoke pivotally mounted upon said wheel pieces at their crossing points.

5. In a six wheel truck, axle journal boxes, two pairs of crossed wheel pieces forming a truck side frame, one end of one wheel piece of each pair being supported upon the middle journal box, one end of one wheel piece of each pair being supported upon one of the end journal boxes, the other end of each of said wheel pieces being supported upon another of said wheel pieces.

6. In a six wheel truck, axle journal boxes, two pairs of crossed wheel pieces forming a truck side frame, one end of one wheel piece of each pair being supported upon the middle journal box, one end of one wheel piece of each pair being supported upon one of the end journal boxes, the other end of each of said wheel pieces being supported upon another of said wheel pieces, and load carrying means supported by each pair of said wheel pieces at their crossing point.

7. In a six wheel truck, articulated wheel pieces serving as equalizers for the load on the truck frame, a bolster therebetween, and means for supporting the bolster at a point coincident with the joints between said articulated wheel piece members.

8. In a six wheel truck, axle journal boxes, a pair of articulated wheel pieces between the middle journal box on each side of the frame and each end journal box, and a bolster supported on both of said pairs of wheel pieces, each of said pairs of wheel pieces serving as an equalizer for the load carried by the bolster.

9. In a six wheel truck, axle journal boxes, wheel pieces each having a fixed end mounted upon one of the journal boxes with its opposite free end extending above an adjacent wheel piece, and springs supported on the latter, the free ends of the wheel pieces mounted on the end journal boxes having spaced spring supports over the fixed ends of the wheel pieces mounted upon the middle journal box.

10. In a six wheel truck, axle journal boxes, wheel pieces each having a fixed end mounted upon one of the journal boxes with its opposite free end extending above an adjacent wheel piece, and springs supported on the latter, the free ends of the wheel pieces mounted on the end journal boxes having spaced spring supports over the fixed ends of the wheel pieces mounted upon the middle journal box, the two wheel pieces at each end of each side of the truck being crossed intermediate their ends and adapted to support the truck load at their crossing points.

11. In a six wheel truck, axle journal boxes, wheel pieces each having a fixed end mounted upon one of the journal boxes with its opposite free end extending above an adjacent wheel piece, and springs supported on the latter, the free ends of the wheel pieces mounted on the end journal boxes having spaced spring supports over the fixed ends of the wheel pieces mounted upon the middle journal box, the two wheel pieces at each end of each side of the truck being crossed intermediate their ends and adapted to support the truck load at their crossing points, and adapted to distribute the truck load equally to the axle journal boxes.

12. In a six wheel truck, axle journal boxes, a saddle on the middle journal box, wheel pieces mounted on each end journal box, and wheel pieces secured at one end to said saddle and extending toward the end of the truck with their other ends supported upon said first-mentioned wheel pieces.

13. In a six wheel truck, axle journal boxes, a saddle on the middle journal box, wheel pieces pivotally secured to said saddle and extending toward the end of the truck, other wheel pieces respectively mounted upon the end journal boxes and extending toward the middle of the truck each crossing one of said first-mentioned wheel pieces and having its inner end supported upon the same adjacent to said saddle.

14. In a six wheel truck, axle journal boxes, a saddle pivotally mounted upon the middle journal box, and wheel pieces pivotally mounted upon said saddle and the end journal boxes.

15. In a six wheel truck, axle journal boxes, a saddle pivotally mounted upon the middle journal box, and wheel pieces pivotally mounted upon said saddle and the end journal boxes, and means yieldingly maintaining longitudinal alignment of said wheel pieces.

In testimony whereof I hereunto affix my signature this 27th day of December, 1922.

FREDERICK R. CORNWALL.